Sept. 12, 1933.  H. RYNALSKI  1,926,653
PREPARATION OF CALCIUM CHLORIDE
Filed Oct. 30, 1930
Fig. A.  Fig. B.  Fig. C.
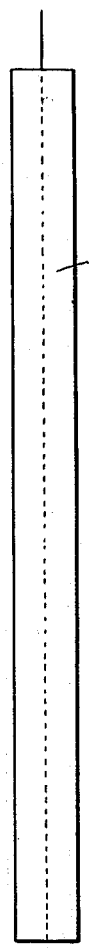
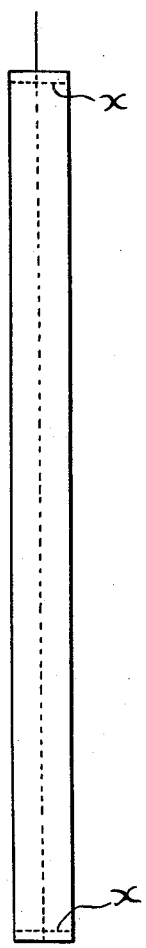
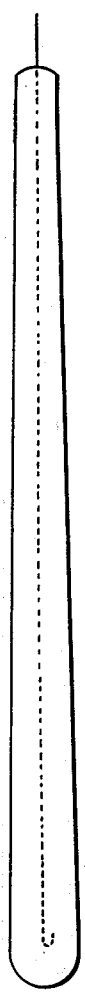
INVENTOR
Henryk Rynalski
BY
ATTORNEY Patented Sept. 12, 1933

1,926,653

UNITED STATES PATENT OFFICE 1,926,653

PREPARATION OF CALCIUM CHLORIDE

Henryk Rynalski, Syracuse, N. Y., assignor to The Solvay Process Company, Solvay N. Y., a corporation of New York Application October 30, 1930. Serial No. 492,151

11 Claims. (Cl. 23—239)

The invention relates to a process for the preparation of calcium chloride and more particularly to calcium chloride in an improved form.

Calcium chloride has heretofore been prepared for the market in various forms such as cakes, granules, flakes and sticks, depending upon the use for which it was intended. When prepared in the form of sticks, more particularly those having relatively small cross-sectional area, it was observed that this form was brittle, and was readily fractured or broken during manufacture and subsequent handling.

In the manufacture of calcium chloride in stick form, the procedure has been to pour the calcium chloride in liquid condition into a metallic mold and permit the calcium chloride to solidify therein. In this mode of procedure the calcium chloride solidifies first at the surface of the mold, and shrinkage of the molded material is thus largely prevented. This lack of shrinkage entails difficulty in removing the calcium chloride from the mold. In order to accomplish removal tapping of the mold is usually resorted to, and inasmuch as the sticks are readily fractured, the tapping must be gentle and of considerable duration. Furthermore, after the sticks have been successfully removed from the mold it is necessary that care be exercised in the handling, packing and shipping.

It is an object of this invention to provide a process for the preparation of calcium chloride in the form of sticks whereby the formed calcium chloride may be readily removed from the molds.

A further object of the invention is to provide a process for preparing calcium chloride in a form which may be easily and economically manufactured on a commercial scale and which is resistant to breakage.

Other objects of the invention are to provide calcium chloride in a form possessing sufficient strength to withstand the usual operations of manufacture, packing and shipping without undue breakage and which is well adapted for a variety of uses, more particularly such as the drying of gases and the removal of ice from bodies of water.

Other objects of the invention will in part be obvious and will in part appear hereinafter.

The invention accordingly comprises the several steps and relation of one or more of such steps with respect to each of the others, and the article possessing the features and properties which are exemplified in the following detailed disclosure, and the scope of the invention will be indicated in the claims.

I have found that calcium chloride may be prepared in a form which may be readily removed from a mold, either with little or not any tapping by providing a reinforcing material within the calcium chloride and about which it is molded, thus yielding a form which is resistant to breakage.

In the practice of the invention for the production of calcium chloride in reinforced form, the calcium chloride in a fused or liquid condition may be introduced into a mold and solidification occasioned about a solid material within the mold. Thus the mold may be provided with a suitable reinforcing material as an iron wire, positioned substantially in the centre of the mold and held in position by suitable extensions or bends, and the calcium chloride in fused or liquid condition introduced. Solidification of the calcium chloride ensues, and the formed material may be readily removed, either with only slight tapping or frequently if the reinforcing material protrudes above the surface of the stick, by merely gripping the protruding portion and withdrawing the calcium chloride.

The reinforcement may be effected by various materials such as a metal which may be in the form of a wire, or a rod or a hollow pipe of desired size, more particularly an iron wire or rod. However, other materials than metals may be used as reinforcing members or cores for example, a string or rope made of a suitable fibre, as cotton, hemp, jute, etc. or paper fibre, or a wooden stick.

Preparation of the calcium chloride in the form of reinforced sticks may be carried out in several ways, of which the following are presented as illustrative:—

The calcium chloride in fused or liquid condition may be introduced into a mold and the reinforcing material subsequently placed therein, or the reinforcing material may be placed in the mold and positioned therein prior to the introduction of the calcium chloride. The positioning of the reinforced material in the mold in the latter instance may be, in the case of a metal, by bending the wire in such a manner that it will be and will remain substantially in the centre of the mold. A further mode of procedure is to dip the reinforcing material into the calcium chloride, withdrawing therefrom, allowing the adhering layer to solidify and repeating the introduction and withdrawal until a mass or stick of the desired size is obtained.

The modes of operation above indicated are shown illustratively in the accompanying drawing in which Fig. A shows the mode of operation followed when the reinforcing material is introduced into the calcium chloride subsequent to pouring;

Fig. B represents the method of procedure when the reinforcing material is positioned in the empty mold prior to pouring and in which case said material is provided with bends or extensions X for positioning the core in the mold; and Fig. C illustrates a stick of calcium chloride formed by repeatedly introducing the material into liquid calcium chloride and withdrawing for solidification. The stick in this case is formed of successive layers of material, and the building up of the calcium chloride in this manner may be to the size best adapted for the purpose for which the calcium chloride is to be utilized, and so also may the size of the molded sticks be determined.

In accordance with the process of the invention whereby calcium chloride is prepared in the form of sticks which are provided with a reinforcing material or core, it is possible to produce stick calcium chloride which may be readily removed from the molds by tapping with little if any breakage, or the removal may be occasioned by simply withdrawing when the reinforcing material protrudes beyond the end of the stick. Even in cases where the force of tapping has been sufficient to cause breakage of the stick, the reinforcing material will hold the pieces together, thus making it possible to use the calcium chloride and preventing a production loss. Furthermore, calcium chloride may be produced by the process of this invention of any desired cross-sectional area or shape and of any desired length. It is particularly applicable in instances where it is desired to utilize calcium chloride in the form of a stick having a small cross-sectional area as compared with the length, inasmuch as such sticks are easily broken during manufacture and subsequent handling.

While there are many operations in which calcium chloride in the form of a stick may be advantageously employed, it is desired to direct attention more particularly to the adaptability of this form for the drying of gases and for the removal of ice from the surface of bodies of water. For example, calcium chloride in this form may be used for cutting ice from the surface of lakes and rivers, to prevent ice jams, to release vessels which are frozen in the ice, to remove ice from the vicinity of docks, etc. It has been found that a stick of calcium chloride approximately two inches in diameter, of substantially triangular cross-section, about thirty inches in length and having a core of iron, is particularly well adapted for the removal of ice. It will be realized of course that the dimensions and shapes herein specifically referred to may be varied and that the invention is in no manner limited thereto.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

I claim:

1. A process for the preparation of calcium chloride which comprises solidifying liquid calcium chloride about a reinforcing core.

2. A process for the preparation of calcium chloride which comprises introducing liquid calcium chloride into a mold and solidifying about a reinforcing core.

3. A process for the preparation of calcium chloride in stick form which comprises solidifying liquid calcium chloride about a reinforcing core.

4. A process for the preparation of calcium chloride in stick form which comprises introducing liquid calcium chloride into a mold, positioning a core of reinforcing material within the body of liquid calcium chloride and cooling said liquid to solidify it about said core.

5. As an article of manufacture, calcium chloride containing reinforcing material.

6. As an article of manufacture, calcium chloride in the form of a stick containing reinforcing material.

7. As an article of manufacture, calcium chloride in the form of a stick containing a core of metal.

8. As an article of manufacture, a stick of calcium chloride approximately two inches in diameter, substantially triangular in cross-section, and containing a core of iron.

9. As an article of manufacture, calcium chloride in the form of an elongated stick approximately two inches in diameter and containing a core of a reinforcing material.

10. As an article of manufacture, calcium chloride in the form of an elongated stick approximately two inches in diameter and containing a core of metal.

11. As an article of manufacture, calcium chloride in the form of a stick approximately two inches in diameter and thirty inches in length and transversed lengthwise by a core of a reinforcing material.

HENRYK RYNALSKI.